United States Patent Office 2,852,533
Patented Sept. 16, 1958

2,852,533

TITANIUM BOROHYDRIDE COMPLEX AND PREPARATION THEREOF

Abner Brenner, Chevy Chase, Md., and Joseph Bish, Ames, Iowa, assignors to the United States of America as represented by the Secretary of the Air Force No Drawing. Application February 9, 1956
Serial No. 564,583

3 Claims. (Cl. 260—346.1)

(Granted under Title 35, U. S. Code (1952), sec. 266)

The invention described herein may be manufactured and used by or for the United States Government for governmental purposes without payment to us of any royalty thereon.

The invention relates to the complex of titanium borohydride with tetrahydrofuran and the method of making it.

There is a known method of preparing the borohydrides of group IV–B elements which is described in U. S. 2,575,760. However, this method is not satisfactory for the production of large quantities of these compounds. For this reason the new method of our invention is particularly important.

It is an object of this invention to provide a new and improved method for producing titanium borohydride economically and conveniently in large quantities.

It is another object of this invention to provide, as a new composition of matter, the complex of titanium borohydride with tetrahydrofuran and a method of making it.

These and other objects of the invention will become apparent as the detailed description of the invention proceeds.

The above objects and other objects are satisfied by the invention which is a method of making titanium borohydride by reacting an alkoxide of titanium with diborane in a non-aqueous medium which is nondestructive of the product borohydride. It is preferred to carry out the reaction in a non-aqueous medium blanketed by an inert gas. If a titanium alkoxide is reacted with diborane in tetrahydrofuran, the complex of the borohydride with tetrahydrofuran is contained in high yield in the reaction mixture. The reaction product composed primarily of boron esters, reaction medium and the borohydride of titanium is easily processed to recover the desired primary borohydride product by distillation, solvent extraction, decantation, crystallization, or other conventional means depending on the nature and solubility of these components of the reaction mixture, since they are so different in chemical and physical properties.

The medium for carrying out the reaction must be a non-aqueous medium, preferably an organic medium. Suitable organic mediums are hydrocarbons such as petroleum ether, ethers such as ethyl ether, or tetrahydrofuran, etc. It is preferred to blanket the reaction mixture with an inert atmosphere such as nitrogen or other suitable gases because of the great inflammability of the borohydride compounds. The reaction can be carried out at about room temperature, i. e. about 68° F., but this is not critical.

The invention will be more clearly understood by the discussion of a specific example thereof which describes the preparation of a titanium borohydride derivative. This method of preparation of titanium borohydride involves the reaction of diborane with a titanium alkoxide of the type $Ti(OR)_4$ in the presence of an organic solvent.

Diborane in an amount of 0.067 mole was passed into a tetrahydrofuran solution containing 0.029 mole of titanium tetrabutylate. As diborane passed through the solution some gassing was observed and heat was evolved. The solution was filtered in an inert atmosphere and the blue crystals washed with petroleum ether. The yield of crystals was 5.0 grams. The filtrate was evaporated nearly to dryness and a high boiling colorless liquid remained behind. It had a boiling point of 225° C. This liquid had properties similar to those of boron esters, but the amount isolated was too small to study thoroughly.

With titanium tetraisopropylate the borohydride compound was obtained in 90% yield. Analysis of the blue crystals gave: percent C=33.0, percent H=10.3, percent B=14.5, percent Ti=29.1.

Theory for $Ti(BH_4)_3 \cdot C_4H_8O$: percent C=29.2, percent H=12.2, percent B=19.4, percent Ti=28.1.

The crystalline blue solid was observed to undergo a partial decomposition at 135–140° C. and upon heating to a higher temperature decomposed completely with the formation of a bright metallic mirror on the walls of the container.

The blue crystals were insoluble in the usual organic solvents with the exception of tetrahydrofuran. They reacted readily with peroxide-containing ethers and such reactive solvents as water.

Titanium borohydride apparently is stabilized by coordination with tetrahydrofuran as indicated by the fact that large crystals of the compounds react rather slowly with the atmosphere on exposure. However, the finely divided compound occasionally ignites spontaneously. The compound can be stored in closed containers for long periods of time without any noticeable decomposition.

The reaction of diborane with titanium esters can be carried out in any other inert organic solvent but isolation is more difficult.

Although the invention has been described in terms of a specific embodiment thereof which is set forth in considerable detail, it should be understood that this is by way of illustration only and that the invention is not necessarily limited thereto since alternative embodiments will become apparent to those skilled in the art in view of the disclosure. Accordingly, modifications are contemplated which can be made without departing from the spirit of the described invention or of the scope of the appended claims.

What is claimed is:

1. The complex of titanium borohydride with tetrahydrofuran having the formula $Ti(BH_4)_3 \cdot C_4H_8O$.

2. A method of making a titanium borohydride complex comprising reacting diborane with a titanium alkoxide having the formula $Ti(OR)_4$, where R is an alkyl group having four carbon atoms, in an inert atmosphere and in the presence of tetrahydrofuran.

3. A method of making a titanium borohydride complex comprising reacting diborane with a titanium alkoxide having the formula $Ti(OR)_4$, where R is an alkyl group having three carbon atoms, in an inert atmosphere and in the presence of tetrahydrofuran.

References Cited in the file of this patent

UNITED STATES PATENTS 2,575,760    Hoekstra _____ Nov. 20, 1951

OTHER REFERENCES

Hoekstra: J. A. C. S., 71: 2488–92 (1949).